United States Patent [19]

Fujiki et al.

[11] 4,146,891
[45] Mar. 27, 1979

[54] VEHICLE COLLISION PREVENTING APPARATUS

[75] Inventors: Norio Fujiki, Yokosuka; Yoshiki Masuno, Amagasaki, both of Japan

[73] Assignees: Mitsubishi Denki Kabushiki Kaisha, Tokyo; Nissan Motor Company, Limited, Yokohama, both of Japan

[21] Appl. No.: 815,297

[22] Filed: Jul. 13, 1977

[30] Foreign Application Priority Data

Jul. 28, 1976 [JP] Japan ................................ 51-89952

[51] Int. Cl.$^2$ ............................................. G01S 9/04
[52] U.S. Cl. ................................................ 343/7 VM
[58] Field of Search ................................... 343/7 VM

[56] References Cited

U.S. PATENT DOCUMENTS

| 3,420,572 | 1/1969 | Bisland | 343/7 VM |
| 3,689,882 | 9/1972 | Dessailly | 343/7 VM |
| 3,725,921 | 4/1973 | Weidman et al. | 343/7 VM |
| 4,073,359 | 2/1978 | Fujiki | 343/7 VM X |

Primary Examiner—Malcolm F. Hubler
Attorney, Agent, or Firm—Oblon, Fisher, Spivak, McClelland & Maier

[57] ABSTRACT

A vehicle collision preventing apparatus determines the danger by an output of a radar for detecting the distance to an obstacle and the relative velocity in a danger determining circuit wherein the distance to the obstacle and the relative velocity at the present are estimated from the data given before disappearing the data of the radar by an estimate arithmetic circuit when a signal reflecting from the obstacle reduces to be incapable of detecting the obstacle by the radar.

1 Claim, 4 Drawing Figures

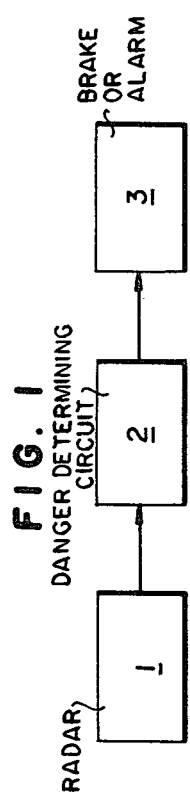
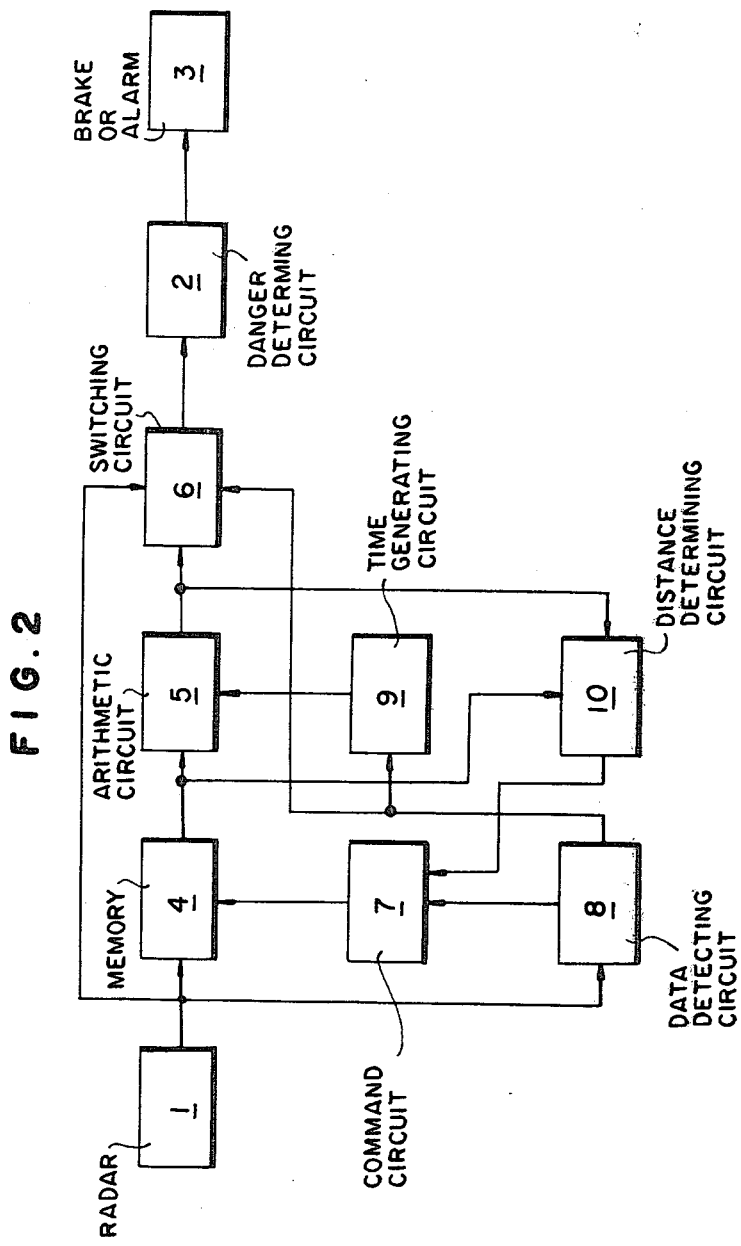

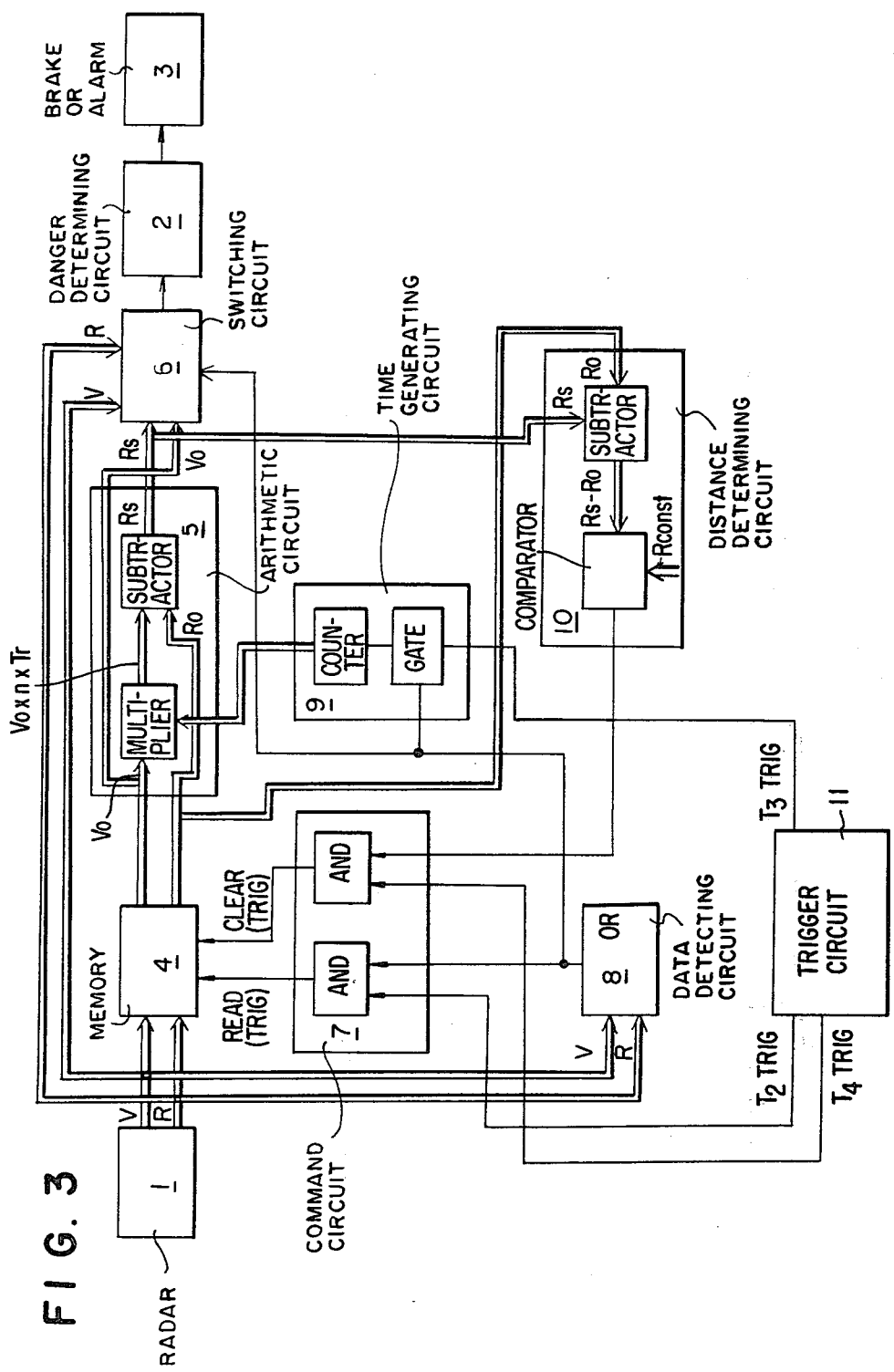

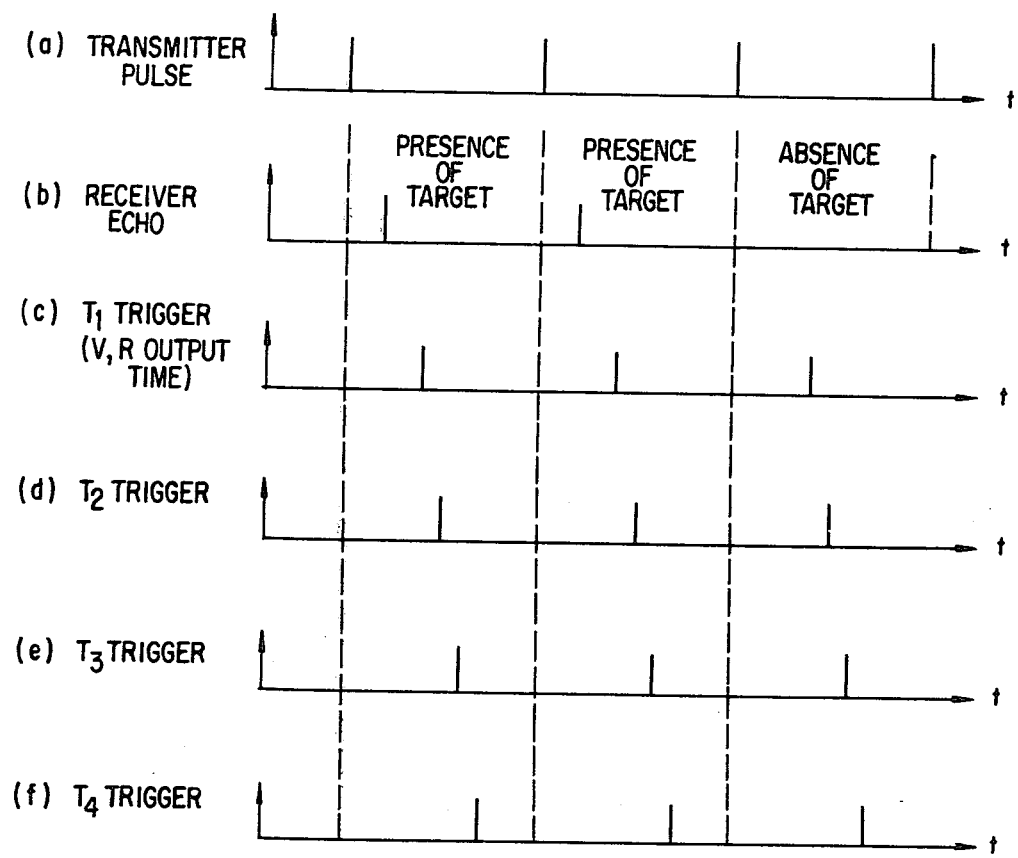

VEHICLE COLLISION PREVENTING APPARATUS

BACKGROUND OF THE INVENTION

The present invention relates to a vehicle collision preventing apparatus by using a radar.

FIG. 1 is a block diagram of the conventional vehicle collision preventing apparatus.

In FIG. 1, the reference numeral (1) designates a radar for detecting the distance between the obstacle and the vehicle and relative velocity; (2) designates a danger determining circuit which determines the danger by the data of the radar (1). For example, it compares $V^2$ (V: relative velocity) and $2\alpha R$ ($\alpha$: constant and R: relative distance). When $V^2 > 2\alpha R$, it determines to be danger whereby the danger signal output is generated. The reference numeral (3) designates a brake or an alarm device which actuates by the danger signal output of the danger determining circuit (2).

In the conventional apparatus, the signal reflected from the obstacle is remarkably varied depending upon the relative position between the obstacle and the radar (1). When the reflection signal reduces, the radar could not work for the detection of obstacle. The data from the radar (1) could not be given whereby the danger could not be determined and the danger signal output has not been given even though the dangerous obstacle is present.

SUMMARY OF THE INVENTION

Accordingly, it is an object of the present invention to provide a vehicle collision preventing apparatus which estimates the distance to an obstacle and the relative velocity at the present from the data given even though the signal reflecting from the obstacle reduces to be incapable of detecting by the radar, and the danger is determined to generate the danger output signal for actuating a brake or an alarm device etc.

The foregoing and other objects of the present invention have been attained by providing a vehicle collision preventing apparatus which determines the danger by an output of a radar for detecting the distance to an obstacle and the relative velocity in a danger determining circuit wherein when a signal reflecting from the obstacle reduces to be incapable of detecting by the radar, the distance to the obstacle and the relative velocity at the present are estimated from the data given before disappearing the data of the radar by an estimate arithmetic circuit to determine the danger.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings.

FIG. 1 is a block diagram of the conventional vehicle collision preventing apparatus;

FIG. 2 is a block diagram of one embodiment of the apparatus of the present invention;

FIG. 3 is a circuit diagram of one embodiment of the apparatus of the present invention; and FIG. 4 is a time chart of transmissions, receivings and triggers.

DETAILED DESCRIPTION OF THE PREFERRED EMBODIMENTS

A preferred embodiment of the vehicle collision preventing apparatus of the present invention will be described in detail by referring to FIG. 2, wherein like reference numerals designate identical or corresponding parts in FIG. 1.

The reference numeral (4) designates a memory circuit for memorizing the data of the distance from the radar (1) to the obstacle and the relative velocity; (5) designates a estimate arithmetic circuit for estimating the place of the obstacle by operating from the data of the memory circuit (4) and the disappearing time given by the below-mentioned obstacle disappearing time-generating circuit (9); (6) designates a switching circuit which outputs either the data of the radar (1) or the data of the estimate arithmetic circuit to the danger determining circuit (2); (7) designates a command circuit for instructing to read-in, to rewrite or to erase the data of the memory circuit (4); (8) designates a data detecting circuit which detects the data from the radar (1); (9) designates an obstacle disappearing time-generating circuit which generates the signal being proportional to the time passed from the disappearance of the data; and (10) designates a driving distance-determining circuit which operates the difference between the estimated distance and the obstacle-disappeared distance to determine whether the difference is more than the predetermined distance.

The operation of the apparatus of the present invention will be illustrated.

(i) The data of the distance from the radar (1) to the obstacle and the relative velocity are given.

In the case, the operation is the same with that of the conventional apparatus.

The output of the radar (1) is fed through the switching circuit (6) to the danger determining circuit (2) wherein the danger of the obstacle is determined from the distance to the obstacle and the relative velocity. When it is danger, the signal for danger is output to actuate the brake or the alarm device (3).

(ii) The data of the distance from the radar (1) to the obstacle and the relative velocity are disappeared during the driving.

The presence of the data of the radar (1) is detected by the data detecting circuit (8). When the datum is not found, the signal for disappearing the datum is fed to the command circuit (7). When the signal for detecting the data is received by the command circuit (7), the read-in command is fed to the memory circuit (4). When the datum is not found, the read-in command is not fed to the memory whereby the memory memorizes the distance and the relative velocity just before the time disappearing the obstacle. The signal for disappearing the datum is fed to the obstacle disappearing time-generating circuit (9) wherein the time signal being proportional to the disappearing time is generated to feed it to the estimate arithmetic circuit (5). The signal is also fed to the switching circuit (6) and the switching circuit (6) switches the signal so as to feed the output of the estimate arithmetic circuit (5) to the danger determining circuit (2).

The datum of the distance R before disappearing the obstacle and the relative velocity V are given from the memory circuit (4) to the estimate arithmetic circuit (5). The datum of the obstacle disappearing time $\Delta t$ is given from the obstacle disappearing time-generating circuit
}

(9) to the estimate arithmetic circuit (5) whereby the estimated distance to the obstacle $R_s$ ($R_s = R - V \times \Delta t$) is calculated by the operation.

The data of the estimated distance $R_s$ and the relative velocity V are fed through the switching circuit (6) to the danger determining circuit (2) wherein the danger of the obstacle is determined from the data of the distance and the relative velocity. When it is danger, the signal for danger is fed to actuate the brake or the alarm device (3).

The datum of the estimated distance $R_s$ is given from the estimate arithmetic circuit (5) to the driving distance-determining circuit (10) and the datum of the distance R before the time disappearing the obstacle is given from the memory circuit (4) to the driving distance-determining circuit (10) wherein the subtraction of the data is made. When the difference is more than the predetermined value, the signal is fed to the command circuit (7) to erase the data in the memory circuit (4).

As described above, even though the data from the radar (1) are disappeared, the distance to the obstacle is estimated by operating the data just before disappearing the data, and the relative velocity is estimated by the data just before disappearing the data whereby the danger is determined. During the time disappearing the obstacle for a short time, the function of the vehicle collision preventing apparatus is effectively imparted.

If the obstacle completely disappears, the danger determining function by the operation is released by the driving distance-determining circuit (10) when the estimated driving distance after the time disappearing the obstacle reaches to the predetermined distance.

In the embodiment, the data of the distance and the relative velocity just before the time disappearing the obstacle are used for estimating the distance and the relative velocity of the obstacle at the present. However if the acceleration of the obstacle is given, the estimates are not precisely the same with the actual distance and relative velocity.

When the error should be eliminated, all of data of distances and relative velocities in the past are read in the memory circuit (4) and the acceleration is calculated by using the data in the estimate arithmetic circuit (5) whereby the distance and the relative velocity at the present can be estimated.

Referring to FIG. 3 and FIG. 4, the operation of the vehicle collision preventing apparatus will be further described.

The digital data of the distance to the obstacle R and the relative velocity V are output from the radar (1) at the times $T_1$. For example, when the maximum measurable distance is 150 m, the digital data are output in 8 bits as 1 m per 1 bit. When the maximum measurable relative velocity is 100 Km/h., the digital data are output in 7 bits as 1 Km/hr. per 1 bit. When no obstacle is found, the data of the distance R and the relative velocity are respectively zero.

The data given by the radar (1) are fed into the data detecting circuit (8) to detect presence or absence of the data. The data detecting circuit (8) is OR circuit to which the data of the distance R and the relative velocity are input. When both of the distance R and the relative velocity V are zero (no data), the signal L is output. When R and/or V are not zero (certain datum is found), the signal H is output. (H: H level of IC and L: L level of IC).

The command circuit (7) comprises AND circuits. When the datum is found, $T_2$ trigger is fed as a read-in command to the memory circuit (4) by the signal H of the data detecting circuit (8), whereby new data of the distance R and the relative velocity V are read in. When the datum is not found, the signal L is output from the data detecting circuit (8) and the $T_2$ trigger is not fed to the memory circuit (4), whereby the data of the distance R and the relative velocity V just before disappearing the obstacle are remained in the memory circuit (4).

The signal L for no data is fed to the obstacle disappearing time-generating circuit (9) which comprises the GATE circuit and the COUNTER circuit. When the signal L is received, the GATE circuit is opened to count the $T_3$ trigger in the COUNTER circuit. The output n of the COUNTER circuit is proportional to the disappearing time $\Delta t$ as shown by the equation $$\Delta t = n \times Tr$$

wherein $n$: counts of the COUNTER circuit; Tr: radar transmission repeating period; t: disappearing time.

The signal L is fed to the switching circuit (6) which switches to feed the output of the estimate arithmetic circuit (65) to the danger determining circuit (2) which receives the data of the distance R and the relative velocity V just before disappearing the obstacle (referring to as $R_o$, $V_o$) from the memory circuit (4) and which receives the counter output signal n from the obstacle disappearing time-generating circuit.

The estimate arithmetic circuit (5) comprises a multiplier and a subtractor to operate the calculation of the following equation (estimated distance operation)

$$R_s = R_o - V_o \times n \times Tr$$

wherein $R_s$: estimated distance; $R_o$, $V_o$, n and Tr are described above.

The data of $R_s$ and $V_o$ are passed through the switching circuit into the danger determining circuit (2) to determine the danger.

The driving distance-determining circuit (10) comprises a subtractor and a comparator. The subtractor is used for the calculation $R_o - R_s = R_m$. The comparator is used for comparing $R_m$ with $R_{const}$. In the case of $R_m \geq R_{const}$, the output (H level) of the comparator is fed to the command circuit (7) and $T_4$ trigger is fed as clear trigger into the memory circuit (4) to erase the data in the memory circuit (4). The trigger circuit (11) generates various triggers.

What is claimed:

1. In a vehicle collision preventing apparatus wherein a radar detects the distance to an obstacle and the relative velocity of said obstacle, and produces output signals representative thereof, and wherein said output signals are applied to a danger determining circuit, the improvement comprising:

data detection means for detecting the presence or absence of said output signals at the output of said radar;

memory means coupled to said radar and said data detector means for storing the values of said radar output signals existing immediately prior to said data detection means detecting an absence of radar output signals;

data synthesizing means coupled to said memory means for estimating a hypothetical distance and a hypothetical relative velocity of said obstacle based on the radar output signals stored in said memory means;

data selection means coupled to said radar, said data synthesizing means and said data detection means for switching to an output of said data selection means said hypothetical distance and relative velocity estimated by said data synthesizing means when said data detection means detects the absence of said radar output signals, and for switching to said output of said data selection means said radar output signals when said data detection means detects the presence of said radar output signals; and, a danger determining circuit coupled to said output of said data selection means for determining the danger of collision represented by the data at said output of said data selection means.

* * * * *